Jan. 11, 1949.    F. G. HODSDON    2,458,779
PRESSURE RELEASER MILKER
Filed Nov. 14, 1945    2 Sheets-Sheet 1
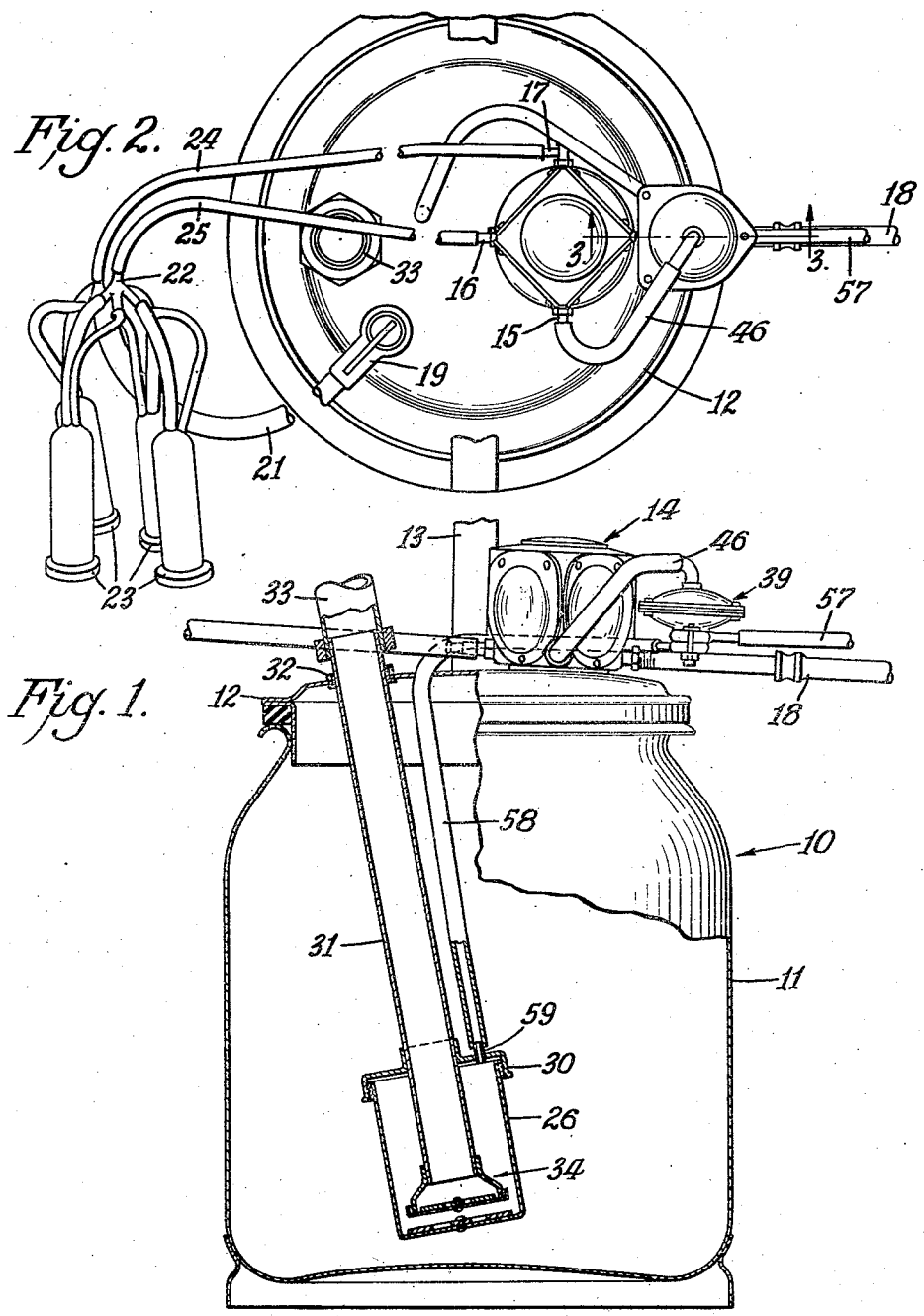

Jan. 11, 1949.    F. G. HODSDON    2,458,779
PRESSURE RELEASER MILKER
Filed Nov. 14, 1945    2 Sheets-Sheet 2
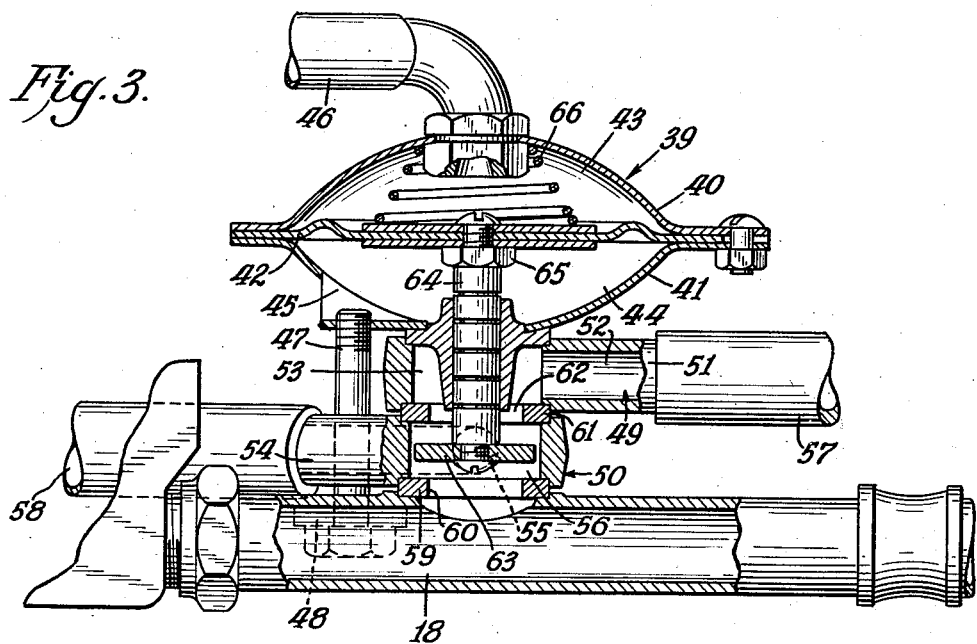
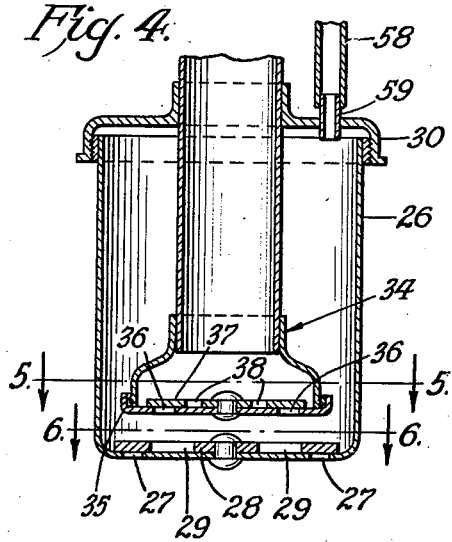
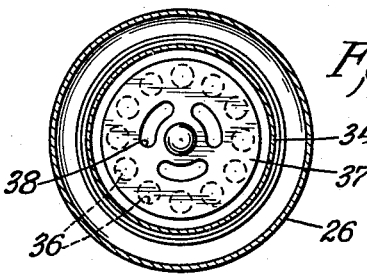
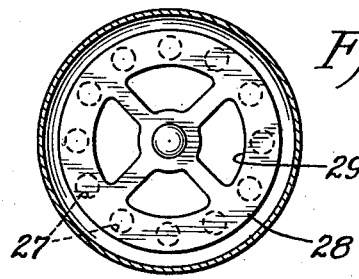
Inventor:
Floyd G. Hodsdon
By: Paul O. Pippel
    Attorney Patented Jan. 11, 1949

2,458,779

UNITED STATES PATENT OFFICE 2,458,779

PRESSURE RELEASER MILKER

Floyd G. Hodsdon, Milwaukee, Wis., assignor to International Harvester Company, a corporation of New Jersey Application November 14, 1945, Serial No. 628,483

7 Claims. (Cl. 31—82)

This invention relates to a releaser milker system. More specifically it relates to a pressure controlling mechanism for releasing flow of milk from a milker pail.

In applicant's Patent 2,102,267, December 14, 1937, a mechanism for the release of milk from a milker pail is clearly disclosed. This mechanism generally consists of a means for stopping the milker and releasing the vacuum in the milker pail. The milk is then forced from the pail by air pressure. Upon exhaustion of milk in the pail, the milking machine is again placed in operation. In this type of milking system, it is to be noted that an interruption of the operation of the milker is necessary.

In order to speed up the milking operation and to save considerable time, it is extremely desirable to provide a milker release system that will have a continuous operation and where the milk will be forced from the milker pail without interruption of the milking process. Releasers have been provided in the art which will allow the release of milk without the interruption of the milking machine. These releasers usually consist of a unit having two milk chambers in which there is a vacuum. The unit has valves that will seal the chambers under vacuum and will allow the flow of milk from the chambers when the vacuum source is cut off, the valves opening by means of gravity. This type of releaser has distinct disadvantages. The unit must be placed in a high place usually a considerable distance from the cow. The milk must be lifted a considerable distance up to the unit by vacuum since the vacuum usually cannot be kept at a consistent level and sporadically drops due to the distance the milk must be lifted. The pulsations of the teat cups are irregular, causing irregular milking. For proper milking that will be advantageous to the cow, the unit should be at the same level as the cow or even lower, thereby permitting steady and consistent vacuum pulsations on the teats.

The quick flapping motion of the gravity valves upon their closing also causes particles of milk in the chamber to be thrown into the vacuum lines, the undesirable result of which is well known to those familiar with milking operations.

A pulsator of the type disclosed in applicant's Patent 1,844,853, February 9, 1932, may be used in conjunction with the invention herein disclosed. As disclosed in this patent, the pulsator is connected to a vacuum source. Reciprocating valves within the pulsator are actuated by the vacuum source to provide for intermittent pulsations of vacuum and atmosphere to a plurality of teat cups which function in a manner familiar to those versed in the art.

An important object then is to provide for an improved milker releaser system.

Another important object is to provide a releaser milker which can be operated from the same level as the cow and which will force the milk upwardly from the milker.

Another important object is to provide a releaser milker the valves of which are so constructed that the release of milk can be accomplished without any of the milk particles entering the vacuum system.

Another important object is to provide a releaser milker which can be operated below the level of the cow and which will lift the milk upwardly into an overhead suitable milk conduit or reservoir.

Another important object is to provide a milking machine which will release a constant flow of milk while the milker is in operation without the necessity of shutting off the milker.

A still further object is to provide an improved regulating mechanism for controlling the vacuum and air pressure supplied to a releaser milker.

Other important objects will become more apparent to those skilled in the art as the disclosure is more fully made.

In the drawings illustrating the invention:

Figure 1 is a view in side elevation of a milker pail showing a pulsator and means for forcing milk from said pail;

Figure 2 is a plan view of the milker pail showing its relationship to a milker claw and teat cups connected thereto;

Figure 3 is a sectional view taken along the line 3—3 of Figure 2, showing the regulating means of the releaser milker;

Figure 4 is a sectional view of a container positioned within the milker pail as indicated in Figure 1;

Figure 5 is a sectional view taken along the line 5—5 of Figure 4; and

Figure 6 is a sectional view taken along the line 6—6 of Figure 4.

Referring to the drawings and particularly to Figures 1 and 2, a milker releaser is generally designated by the numeral 10 and includes a milker pail 11 and a cover portion 12 having a suitable lifting handle 13. Connected to the top of the cover 12 is a milking pulsator 14 having outlet nipples 15, 16, and 17. A conduit 18 containing vacuum is connected to the pulsator. This pulsator is of the type disclosed in the abovementioned patent and need not further be described.

As best shown in Figure 2, inlet valve 19 is connected to the cover 12 and is in communication with the milker pail 11. A milk conduit 21 in communication with the valve 19 is connected to a milker claw 22 and to teat cups 23. Vacuum and atmospheric pressure to the teat cups is supplied by conduits 24 and 25 connected at one end to the milker claw 22 and at the other end to the nipples 16 and 17 of the pulsator 14.

A container 26 is mounted within the milker pail 11, said container consisting of a plurality of milk inlet openings 27 provided at the bottom thereof. The openings 27 are normally sealed by a valve 28 having a plurality of openings 29, said valve 28 being suitably fastened to the container 26. A discharge conduit 31 extends through a cover 30 at the top of said container 26. The conduit 31 extends upwardly through the milker pail 12 and is rigidly fastened thereto by a clamping nut 32. The top of the conduit 31 is fastened to a flexible conduit 33 which is in communication with milk pipes and milk storage chambers not shown. The bottom portion of the conduit 31 is enclosed in a collar 34, the end of which is enclosed by a cover 35. The cover 35 contains a plurality of inlet openings 36, said inlet openings normally being sealed by a valve 37 having a plurality of slotted openings 38. The valves 28 and 37 may be made of any flexible material such as pure or synthetic rubber, etc. or they may consist of thin flexible disks of spring steel. The valves are each fastened by means of a centrally positioned rivet and the valves, therefore, are free to move vertically to cover or uncover the inlet openings 27 and 36 during pressure variations within the container.

A regulating means is generally designated by the numeral 39 and consists of dished portions 40 and 41. Clamped between the dished portions 40 and 41 is a diaphram 42 which forms an upper air-tight chamber 43 and a lower chamber 44, said lower chamber 44 being open to the atmosphere as indicated at 45. The upper chamber 43 is in communication with a conduit 46 which is connected to the nipple 15 of the pulsator 14, as best shown in Figure 2.

The regulating means 39 is rigidly mounted on the vacuum conduit 18 by means of a bolt 47 extending through a lug 48, said bolt 47 being threaded into the dished portion 41.

Disposed between the regulating means 39 and the vacuum conduit 18 are fittings 49 and 50. The fitting 49 is provided with a neck portion 51 having a bore 52 in communication with a chamber 53 formed in the end of the fitting 51. The fitting 50 is provided with a similar neck portion 54 having a bore 55 in communication with a chamber 56 formed in the fitting 50. A flexible conduit 57 is connected to the neck of the fitting 51 and extends to a compressed air tank not shown. A flexible conduit 58 is connected to the neck portion 54 and extends through the cover 12 to a nipple 59 in communication with the container 26. The chamber 56 is in communication with the vacuum conduit 18 by means of a valve seat 59 being provided with an opening 60. The chamber 56 is also in communication with the chamber 53 by means of a valve seat 61 being provided with an opening 62. A valve 63 of any suitable material is contained within the chamber 56 and is connected to a valve stem 64 which in turn is rigidly fastened to the diaphragm 42 by means of a nut 65. A spring 66 positioned within the chamber 43 is in abutment with the dished portion 40 and the diaphragm 42.

The operation of the releaser milker is as follows: The pulsator 14 transmits intermittent pulsations to the teat cups 23, whereupon the milk starts flowing thru a hose 21 where it is then drawn into the milker pail by the vacuum therein. The milker pail 11, of course, is under a constant vacuum. Intermittent pulsations of the pulsator 14 are transmitted to the diaphragm 42 of the regulating means 39. The vacuum pulsation moves the diaphragm 42 upwardly causing the valve 63 to seat over the opening 62 in the valve seat 61. At this moment a source of compressed air is cut off and the vacuum line 18 is in communication with the flexible conduit 58 extending into the container 26. The vacuum thus created in the container 26 is equal to the vacuum in the milker pail 11. This permits the milk to flow through the openings 29 and past the valve 28. Milk is prevented from entering into the conduit 31 by the pressure of the valve 37 over the inlet openings 36, said pressure, of course, being created by the vacuum in the container 26.

During the intermittent relief of vacuum in the chamber 43 by the pulsator 14, the valve 63 is snapped downwardly over the valve seat 59 thereby closing the opening 60 and cutting off the vacuum source. At this moment the compressed air will flow into the flexible conduit 58 and thereupon into the container 26. The pressure on the top of the milk contained within the container 26 will thereupon cause the unseating of the valve 37 from the inlet openings 38, thereby forcing milk upwardly into the conduit 31.

It will be seen from the above description and the operation that a milker releaser is provided that can be operated from the same floor level or lower than the cow. The milk is forced upwardly out of the pail and the mechanism used requires no greater space than the ordinary milker pail.

Unlike the ordinary releaser the unit can be placed right next to the cow and no long vacuum conduit from the releaser is necessary. The milker releaser can be so placed that the flow of milk from the teat cups will be assisted by gravity. The mechanism provided also minimizes any possibility of milk particles entering the vacuum line or the pail overflowing. It can be seen therefore that an improved releaser milker has been provided which fully embodies the objects of the invention.

It is the intention to cover all changes and modifications of the example of the invention herein shown which do not depart from the spirit and scope of the invention which has been defined in the appended claims.

What is claimed is:

1. In a releaser milker system, a milk receiver pail, a pulsator associated with said pail for supplying intermittent vacuum and atmosphere pulsations to a plurality of teat cups, said pail having a vacuum therein; the combination with said pail, of a container mounted within said pail, said container being provided with a milk intake opening and a milk discharge opening, a regulating means actuated by the pulsator for alternately creating air pressure and vacuum within said container, said regulating means having a vacuum and a compressed air connection, means for sealing the intake opening of the container upon the compressed air application of said regulating means, thereby permitting the air pressure to expel milk through said discharge opening, and means for sealing said discharge openings upon the vacuum application of said regulating means thereby permitting the milk to flow from said pail into said container.

2. In a releaser milker system, a milk receiver pail, a pulsator associated with said pail for supplying intermittent vacuum and atmosphere pulsations to a plurality of teat cups, said pail having a vacuum therein; the combination with said pail, of a container associated therewith and having a milk intake opening, a closed-end conduit having its closed end terminating within said container, said conduit having a milk intake opening, a regulating means associated with said pulsator for alternately connecting air pressure and vacuum to said container, said regulating means having a vacuum and a compressed air connection, means for permitting the flow of milk from said pail into said container upon the vacuum application of said regulating means, and means for permitting the flow of milk from said container into said conduit upon the compressed air application of said regulating means.

3. In a releaser milker system, a milk receiver pail, a pulsator mounted on said pail for supplying intermittent vacuum aid atmosphere pulsations to a plurality of teat cups, said pail having a vacuum therein; the combination with said pail, of a container associated therewith and having a milk intake opening, a closed-end conduit extending into and terminating within said container, said conduit having a milk intake opening, a regulating means actuated by said pulsator for alternately connecting air pressure and vacuum to said container, said regulating means having a vacuum and a compressed air connection, valve means for permitting the flow of milk from the pail into the container upon the vacuum application of said regulating means, and valve means for permitting the flow of milk from said container into the conduit upon the compressed air application of said regulating means.

4. In a releaser milker system, a milk receiver pail, a pulsator mounted within said pail for supplying intermittent vacuum and atmosphere pulsations to a plurality of teat cups, said pail having a vacuum therein; the combination with said pail, of a container associated therewith and having a milk intake opening, a closed-end conduit extending outwardly of said pail and terminating within said container, said conduit having a milk intake opening, a regulating means actuated by said pulsator for alternately connecting air pressure and vacuum to said container, said regulating means having a vacuum and a compressed air connection, valve means for permitting the flow of milk from said pail into said container upon the vacuum application of said regulating means, and valve means for permitting the flow of milk from said container into the conduit upon the compressed air application of said regulating means.

5. In a releaser milker system, a milk receiver pail, a pulsator associated with said pail for supplying intermittent vacuum and atmosphere pulsations to a plurality of teat cups, said pail having a vacuum therein; the combination with said pail, of a container, a regulating means associated with said pulsator, said regulating means being connected to a compressed air source and a vacuum source, valve means for alternately opening and closing said air pressure and vacuum source, said valve means being actuated by the intermittent pulsation of said pulsator, conduit means for transmitting pressure or vacuum, said conduit means being in communication with the regulating means and said container, valve means for permiting the flow of milk from said pail into said container upon the closing of said compressed air source and the opening of said vacuum source, and valve means for permitting the discharge of milk from said container and said pail upon the closing of said vacuum source and the opening of said compressed air source.

6. In a releaser milker system, a milk receiver pail, a pulsator associated with said pail for supplying intermittent vacuum and atmosphere pulsations to a plurality of teat cups, said pail having a vacuum therein; the combination with said pail of a container having a milk intake opening, a closed-end conduit terminating within said container, said conduit having a milk intake opening, a regulating means associated with said container and in communication with said pulsator, said regulating means comprising a compressed air inlet and a vacuum inlet, a valve means for alternately closing and opening said compressed air inlet and said vacuum inlet thereby alternately supplying compressed air and vacuum to said container. said valve means being actuated by the intermittent pulsations of said pulsator, a second valve means for permitting the flow of milk from said pail into said container upon the closure of said compressed air inlet and the opening of said vacuum inlet, and a third valve means for permitting the intake of milk from said container into said conduit upon the closure of said vacuum inlet and the opening of said compressed air inlet.

7. The combination with a milker pail having a pulsator associated therewith, a conduit means for transmitting vacuum to said pulsator and to said pail, of a container having a milk inlet opening in communication with said pail, a milk discharge means associated with said container, a regulating means having a vacuum source in communication with said container, means for supplying compressed air from a source to said regulating means and to said container, a valve having a diaphragm connected thereto, means for transmitting intermittent vacuum pulsations to said diaphragm, said valve being adapted to alternately cut off said vacuum source and the compressed air, whereby the milk will flow through said inlet opening into said container while under vacuum and will be forced therefrom through said discharge opening upon the entry of compressed air.

FLOYD G. HODSDON.

REFERENCES CITED

The following references are of record in the file of this patent:

UNITED STATES PATENTS

| Number | Name | Date |
|---|---|---|
| 1,354,666 | Lane | Oct. 5, 1920 |

FOREIGN PATENTS

| Number | Country | Date |
|---|---|---|
| 12,619 | Australia | Apr. 2, 1928 |